(12) United States Patent
Yamamoto et al.

(10) Patent No.: US 9,073,567 B2
(45) Date of Patent: Jul. 7, 2015

(54) STEERING APPARATUS FOR AN AUTOMOBILE

(75) Inventors: Kou Yamamoto, Gunma (JP); Noritomo Narita, Gunma (JP); Youhei Nakazato, Gunma (JP)

(73) Assignee: NSK Ltd. (JP)

( * ) Notice: Subject to any disclaimer, the term of this patent is extended or adjusted under 35 U.S.C. 154(b) by 336 days.

(21) Appl. No.: 13/522,816

(22) PCT Filed: May 17, 2012

(86) PCT No.: PCT/JP2012/062651
§ 371 (c)(1),
(2), (4) Date: Oct. 5, 2012

(87) PCT Pub. No.: WO2012/157703
PCT Pub. Date: Nov. 22, 2012

(65) Prior Publication Data
US 2013/0199866 A1    Aug. 8, 2013

(51) Int. Cl.
*B62D 1/187* (2006.01)
*B62D 5/04* (2006.01)
*B62D 1/16* (2006.01)
*B62D 1/184* (2006.01)

(52) U.S. Cl.
CPC .............. *B62D 5/0403* (2013.01); *B62D 1/187* (2013.01); *B62D 1/16* (2013.01); *B62D 1/184* (2013.01); *B62D 5/04* (2013.01)

(58) Field of Classification Search
CPC .......... B62D 1/187; B62D 5/04; B62D 1/184; B62D 5/0403; B62D 1/164
USPC ............................ 180/443, 444; 280/775, 777
See application file for complete search history.

(56) References Cited

U.S. PATENT DOCUMENTS

| | | | | |
|---|---|---|---|---|
| 8,651,526 | B2* | 2/2014 | Nakamura et al. ............. | 280/777 |
| 8,678,437 | B2* | 3/2014 | Narita et al. ................... | 280/777 |
| 2005/0029795 | A1* | 2/2005 | Camp et al. .................... | 280/777 |

(Continued)

FOREIGN PATENT DOCUMENTS

| | | |
|---|---|---|
| EP | 1992544 | 11/2008 |
| JP | 2000-085596 | 3/2000 |

(Continued)

*Primary Examiner* — Anne Marie Boehler
(74) *Attorney, Agent, or Firm* — Hartman Global IP Law; Gary M. Hartman; Domenica N. S. Hartman

(57) ABSTRACT

Construction is achieved wherein the front-end section of an outer column 18a can be assembled in the rear-end section of a housing 11a that houses an electric power steering apparatus 10a from below. At least the front-end section of the outer column 18a is formed into a U shape that is open on the top end. A connection and fastening section 36 that can be inserted inside the front-end section of the outer column 18a through an opening on the top end of the front-end section is provided on the rear-end section of the housing 11a. After the connection and fastening section 36 has been inserted inside the front-end section of the outer column 18a through the opening at the top end of the front-end section, fastening nuts 40 are screwed onto the tip end sections of fastening bolts 39 that are inserted in the left-right direction through portions near the top ends of the connection and fasting section 36 and the front-end section of the outer column 18a, and by tightening the nuts 40, the connection and fastening section 36 and front-end section of the outer column 18a are connected and fastened together.

7 Claims, 9 Drawing Sheets

(56) References Cited

U.S. PATENT DOCUMENTS

| | | | |
|---|---|---|---|
| 2005/0258627 A1* | 11/2005 | Sadakata et al. | 280/775 |
| 2006/0000661 A1 | 1/2006 | Philippe | |
| 2006/0117889 A1* | 6/2006 | Segawa et al. | 74/425 |
| 2006/0119090 A1* | 6/2006 | Burr et al. | 280/775 |
| 2008/0252056 A1* | 10/2008 | Moriyama et al. | 280/775 |
| 2008/0290641 A1* | 11/2008 | Galehr et al. | 280/775 |
| 2009/0218800 A1* | 9/2009 | Rouleau et al. | 280/775 |

FOREIGN PATENT DOCUMENTS

| | | |
|---|---|---|
| JP | 2001-334945 | 12/2001 |
| JP | 2002-302046 | 10/2002 |
| JP | 2004-034884 | 2/2004 |
| JP | 2008-087583 | 4/2008 |
| JP | 2008-174239 | 7/2008 |
| JP | 2011-046309 | 10/2011 |

* cited by examiner

STEERING APPARATUS FOR AN AUTOMOBILE

TECHNICAL FIELD

The present invention relates to a steering apparatus for an automobile that is used for applying a steering angle to the steered wheels, and particularly, relates to construction of a connecting section between the front end section of the steering column and the housing of an electric power steering apparatus in a steering apparatus for an automobile provided with an electric power steering apparatus.

BACKGROUND ART

As illustrated in FIG. 8 and FIG. 9, a steering apparatus for an automobile is constructed, for example, so that rotation of a steering wheel 1 is transmitted to an input shaft 3 of a steering-gear unit 2, and as the input shaft 3 rotates, a pair of left and right tie rods 4 are pushed and pulled so as to apply a steering angle to the front wheels (steered wheels). The steering wheel 1 is supported by and fastened to the rear-end section of a steering shaft 5, and with this steering shaft 5 inserted into a cylindrical shaped steering column 6, the steering shaft 5 is supported by the steering column 6 so as to be able to rotate freely. Moreover, the front-end section of the steering shaft 5 is connected to the rear-end section of an intermediate shaft 8 by way of a universal joint 7, and the front-end section of this intermediate shaft 8 is connected to the input shaft 3 by way of a separate universal joint 9.

The steering apparatus for an automobile that is illustrated in the figures, together with comprising an electric power steering apparatus 10 that assists the operator steer by way of rotation of a motor, also comprises a tilt mechanism for adjusting the up-down position of the steering wheel, and a telescopic mechanism for adjusting the forward-backward position of the steering wheel 1. Therefore, the front-end section of the steering column 6 fits with and fastens to the rear-end section of a housing 11 that houses the component parts of the electric power steering apparatus 10, and this housing 11 is supported by the vehicle body 12 so as to be able to pivot around a horizontal shaft 13 that is arranged in the left-right direction. The steering shaft 5 comprises a combination of an inner shaft 15 and an outer shaft 16 that are capable of transmitting rotation force and are capable of relative displacement in the axial direction. On the other hand, the steering column 6 comprises a combination of an inner column 17 and an outer column 18 that are capable of relative displacement in the axial direction. Furthermore, the portion near the rear end of the outer column 18 is supported by a vehicle-side bracket 19 that is supported by the vehicle body 19 so that the fastened state to the vehicle side bracket 19 can be switched between a fastened state and unfastened state.

In order to achieve this kind of support construction, a pair of holding plate sections 20 of the vehicle-side bracket 19 are arranged at a position on both sides in the left-right direction of the portion near the rear end of the outer column 18 and a column-side bracket 21 that is attached and fastened to the bottom surface of this portion near the rear end. Arc-shaped long holes 22 in the up-down direction that center around the horizontal shaft 13 are formed at positions in these holding plate sections 20 so as to be aligned with each other. Moreover, long holes 23 that are long in the forward-backward direction in the axial direction of the outer column 18 are formed at positions in the side plate sections of the column-side bracket 21 so as to be aligned with each other. An adjustment rod 24, which is a rod shaped member, is inserted in the forward-backward long holes 23 and the up-down long holes 22. A head section 25, which is a pressing section, is formed on the base-end section of this adjustment rod 24. An adjustment nut 26, which is a pressing section, is screwed onto the portion of the tip end section of this adjustment rod 24 that protrudes from the up-down hole 22, and the base-end section of an adjustment lever 27 is connected and fastened to this adjustment nut 26. In the construction illustrated in the figure, the adjustment rod 24, the adjustment nut 26 and the adjustment lever 27 form an expanding-contracting mechanism for switching between the fastened state and unfastened state between the vehicle-side bracket 19 and the steering column 6.

When adjusting the up-down position and the forward-backward direction of the steering wheel 1, the adjustment lever 27 is operated, and by loosening the adjustment nut 26 the distance between the inside surfaces of the holding plate sections 20 is expanded. As a result, the friction force that acts between the holding plate sections 20 and the side plate sections of the column-side bracket 21 is sufficiently decreased, and the fastened state of the outer column 18 to the vehicle-side bracket 19 is released. In this state, when the up-down position of the steering wheel 1 is adjusted, the steering column 6 and steering wheel 1 are pivoted around the horizontal shaft 13 within a range that the adjustment rod 24 can displace inside long hole 22 in the up-down direction. On the other hand, when the forward-backward position of the steering wheel 1 is adjusted, the entire length of the steering column 6 and steering shaft 5 is extended or contracted within the range the adjustment rod 24 can displace inside the long hole 23 in the forward-backward direction. After adjustment, the adjustment lever 27 is operated, and the adjustment nut 26 is tightened. By doing so, the friction force is sufficiently increased, and the outer column 18 is fastened to the vehicle-side bracket 19. As a result, the steering wheel 1 is held in the adjusted position.

Incidentally, as construction for connecting the front-end section of the steering column 6 and the rear-end section of the housing 11 of this kind of steering apparatus, construction in which the front-end section and the rear-end section fit together in the axial direction is widely used. As an example of this kind of connecting construction, JP2011-46309(A) discloses construction in which the cylindrical shaped front-end section of the steering column is pressed onto and fits around a cylindrical shaped section that is formed on the rear end section of the housing with an interference fit. Moreover, JP2000-85596(A) discloses a method in which the front end section of a steering column having a notched cylindrical shape fits around a cylindrical section that is formed on the rear-end section of the housing, then a fastener fits around this front end section and by elastically constricting the diameter of the front-end section with this fastener, the inner surface of the front-end section forms a strong friction fit with the outer circumferential surface of the cylindrical section. Furthermore, JP2008-87583(A) discloses construction in which the cylindrical shaped front-end section of the steering column fits inside a circular hold that is formed on the rear-end section of the housing, and a flange section that is formed around the outer circumferential surface of the portion near the front end of the steering column is connected and fastened to the rear-end surface of the housing with a plurality of bolts.

When using any of the conventional construction as construction for connecting the front-end section of the steering column 6 and the rear-end section of the housing 11, the assembled direction of the steering column 6 with respect to the housing 11 when assembling this connection is in the axial direction of the steering column 6. On the other hand, when assembling the portion near the rear end of the steering column 6 in the vehicle-side bracket 19, this portion near the rear end of the steering column 6 is inserted between the holding plate sections 20 of the vehicle-side bracket 19 from the bottom edge side of these holding plate sections 20. In other words, the assembly direction of the steering column 6 in the vehicle-side bracket 19 is in the radial direction of the steering column 6. In this way, in the case of the conventional construction, the assembly direction of the steering column 6 in the housing 11 and the assembly direction of the steering column 6 in the vehicle-side bracket 19 are different.

RELATED LITERATURE

Patent Literature

[Patent Literature 1] JP2011-46309(A)
[Patent Literature 2] JP2000-85596(A)
[Patent Literature 3] JP2008-87583(A)

SUMMARY OF INVENTION

Problem to be Solved by the Invention

Taking the situation above into consideration, it is the object of the present invention to provide construction of a steering apparatus for an automobile wherein the assembly direction of the steering column in the housing of the electric steering apparatus and the assembly direction of the steering column in the vehicle-side support bracket coincide with each other.

Means for Solving the Problems

The steering apparatus for an automobile of the present invention has a steering column, a housing that is supported by the vehicle body and that houses an electric power steering apparatus, a vehicle-side bracket that is supported by the vehicle body, and an expansion and contraction mechanism.

The steering column has a front-end section that is formed in a U-shape that is open at the top and comprises a pair of left and right side plate sections that face each other and a bottom plate section that connects to the edges on the bottom ends of these side plate sections.

The housing for an electric power steering apparatus has a connection and fastening section on the rear that is capable of being inserted inside the front-end section of the steering column through an opening in the top end of the front-end section, and when inserted inside the front-end section is capable of a non-circular fit in the front-end section.

The vehicle-side bracket has a pair of holding plate sections that are located at positions on both the left and right sides of the middle section of the steering column, with the portion between the edges on bottom edges being open.

The expansion and contraction mechanism comprises a rod shaped member that is inserted in the left-right direction through through holes that are formed in positions of the holding plate sections that are aligned with each other, and a pair of pressing sections that are provided on both end sections of the rod shaped member. The expansion and contraction mechanism is constructed such that by moving these pressing sections away from each other or close to each other in the axial direction of the rod shape member, the distance between the holding plate sections is changed, and when this space is contracted, the expansion and contraction mechanism fastens the steering column to these holding plate sections.

With the connection and fastening section being fitted with a non-circular fit inside the front-end section, the connection and fastening section and the front-end section of the steering column are connected and fastened together by a bolt.

Preferably, when embodying the present invention, through holes in the left-right direction are formed at positions in side plate sections of the front-end section of the steering column and in the connection and fastening section of the housing that are aligned with each other; and together with inserting a bolt through these through holes that are formed in the side plate sections and the connection and fastening section, a nut is screwed on the tip end section of the bolt.

Furthermore, preferably, more than one set of the through holes is formed in the side plate sections and the connection and fastening section, and together with inserting a bolt through each of the through holes, a nut is screwed on the tip end section of the bolt.

The present invention can be applied to a steering apparatus that comprises a tilt mechanism for making it possible to adjust the up-down position of the steering wheel that is fastened to the rear-end section of the steering shaft. In this case, the housing is supported by the vehicle body so as to be able to pivotally displace around a horizontal shaft that is arranged in the left-right direction. The through holes in the holding plate sections are long holes in the up-down direction that are arc shaped around the center of the horizontal shaft, a through hole is formed in the middle section of the steering column at a position that is aligned with the long holes in the up-down direction, and the rod member is inserted through the long holes in the up-down direction of the housing and the through hole of the steering column. With this construction, when the fastened state of the steering column being fastened to the holding plate sections is released by enlarging the distance between the holding plate sections by the expansion and contraction mechanism, the up-down position of the steering column can be adjusted within the range that the rod shaped member can displace in the long holes in the up-down direction.

Furthermore, the present invention can be applied to construction that comprises a telescopic mechanism for making it possible to adjust the forward-backward position of the steering wheel. In this case, the steering column comprises a front column that is located on the front side, and a rear column that is located on the rear side and assembled so as to be able to displace relative to the front column. A front-end section is formed on the front column. A through hole is formed in the rear section of the front column at a position that is aligned with through holes in the holding plate sections. On the other hand, a long hole in the forward-backward direction that is long in the axial direction of the rear column is formed in the rear column at a position that is aligned with through holes in the holding plate sections and the through holes in the front column. The rod shaped member is inserted through the through holes in the holding plate sections, the through holes in the front column and the long holes in the forward-backward direction of the rear column. In this construction, when the fastened state of the rear column being fastened to the holding plate sections and front column is released by enlarging the distance between the holding plate sections by the expansion and contraction mechanism, it is possible to adjust the forward-backward position of the rear column within a range that the rod shaped member can displace inside the long hole in the forward-backward direction.

Preferably, the front column is an outer column, and this entire outer column is formed in a U-shape that is open at the top with the side plate sections and the bottom plate section. Moreover, the rear column is an inner column and is such that the front section of this inner column fits inside the rear section of the outer column. The expansion and contraction mechanism expands or contracts the inner dimension of the rear section of the outer column by changing the distance between the holding plate sections, such that when the inner dimension is contracted, displacement in the axial direction of the inner column with respect to the outer column is suppressed, and when the inner dimension is expanded, displacement in the axial direction of the inner column with respect to the outer column is possible.

In this construction as well, preferably through holes are formed in the left-right direction at positions in the side plate sections of the outer column and in the connection and fastening section of the housing that are aligned with each other, and together with inserting a bolt through these through holes that are formed in the side plate sections and the connection and fastening section, a nut is screwed on the tip end section of the bolt. In this case the through holes that are formed in the side plate section through which the bolt is inserted, and the through holes that are formed in the rear section of the side plate sections through which the rod shaped member is inserted are respectively formed in portions near the openings on the top end of the side plate sections.

Effect of the Invention

With the steering apparatus for an automobile of the present invention, it is possible to make the assembly direction of the steering column in the vehicle-side bracket and the assembly direction of the steering column in the housing for the electric power steering apparatus coincide with each other. Therefore, the work for this assembly can be performed in one process, and thus it is possible to improve the ease of assembly of the steering apparatus.

In other words, when assembling the steering column in the vehicle-side bracket, the middle section of the steering column is inserted between the pair of holding plate sections from the bottom edge side of the holding plate sections. That is, the assembly direction of the steering column in the vehicle-side bracket is in the radial direction of the steering column (direction from the bottom surface toward the top surface). On the other hand, when assembling the steering column in the housing, the connection and fastening section that is provided on the rear section of the housing is inserted into the front-end section of the steering column through an opening in the top end of the front-end section. That is, the assembly direction of the steering column in the housing is also in the radial direction of the steering column (direction from the bottom surface toward the top surface).

MODES FOR CARRYING OUT THE INVENTION

Example 1

Figure 1:
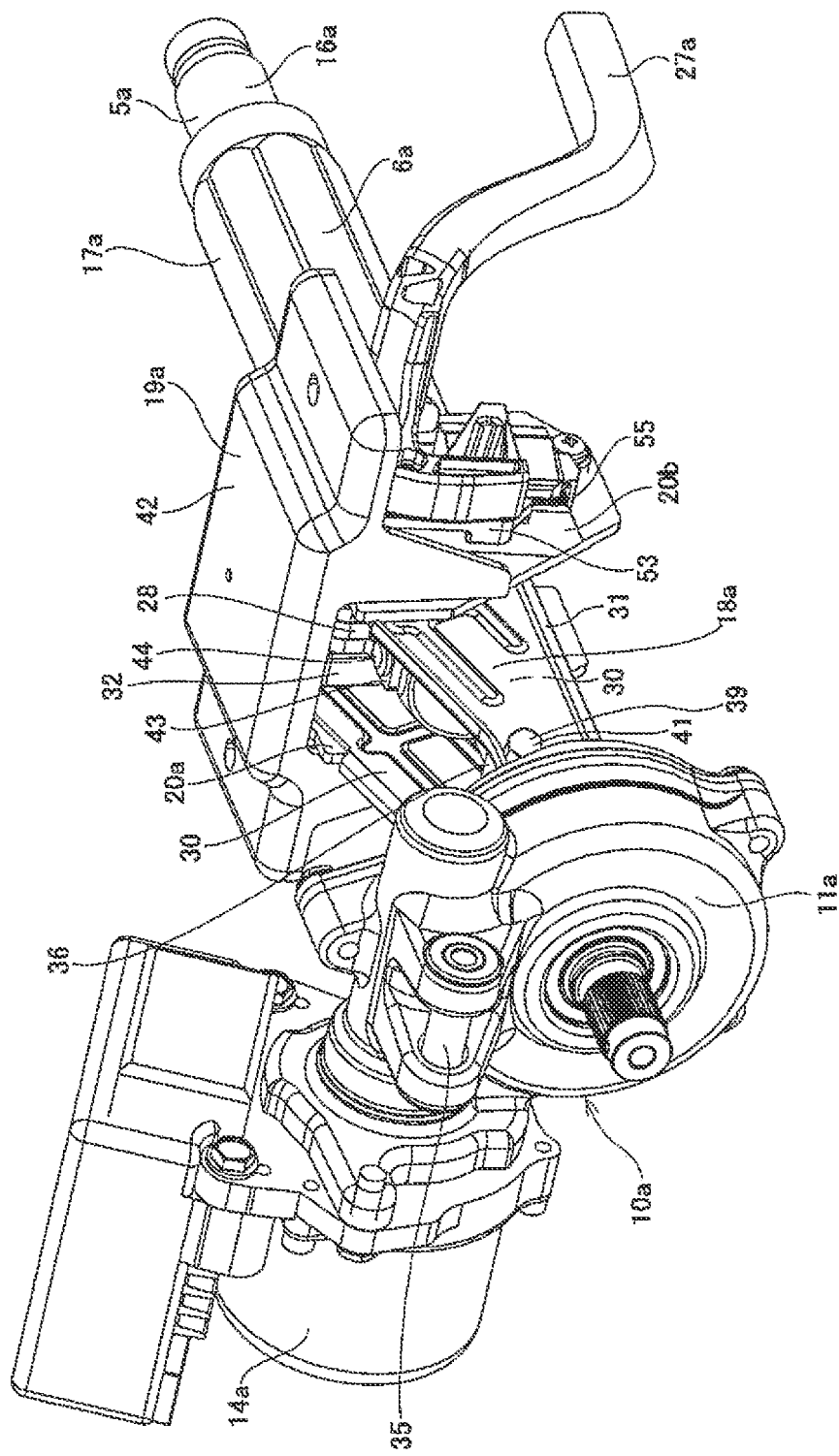
FIG. 1 is a perspective view illustrating a first example of an embodiment of the present invention as seen from the upper front.
Figure 2:
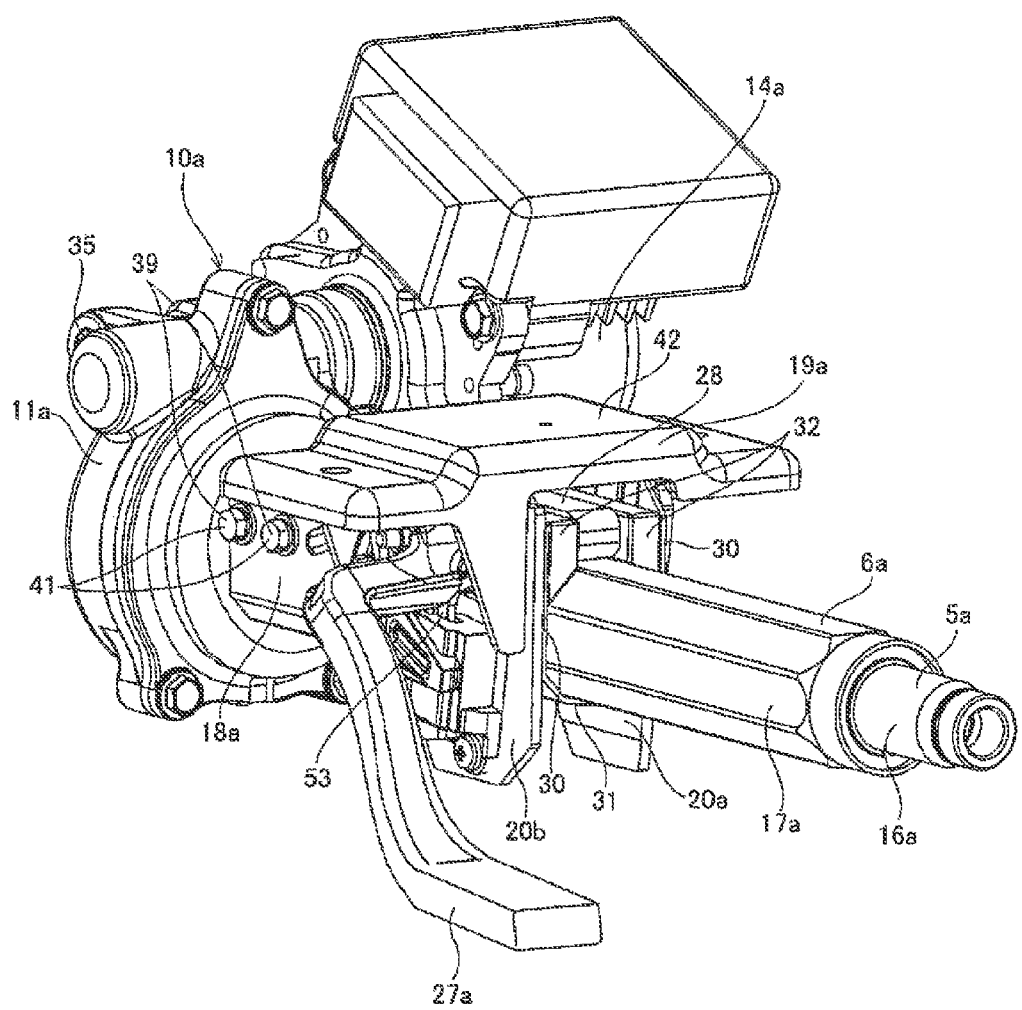
FIG. 2 is a perspective view illustrating the first example as seen from the upper rear.
Figure 3:
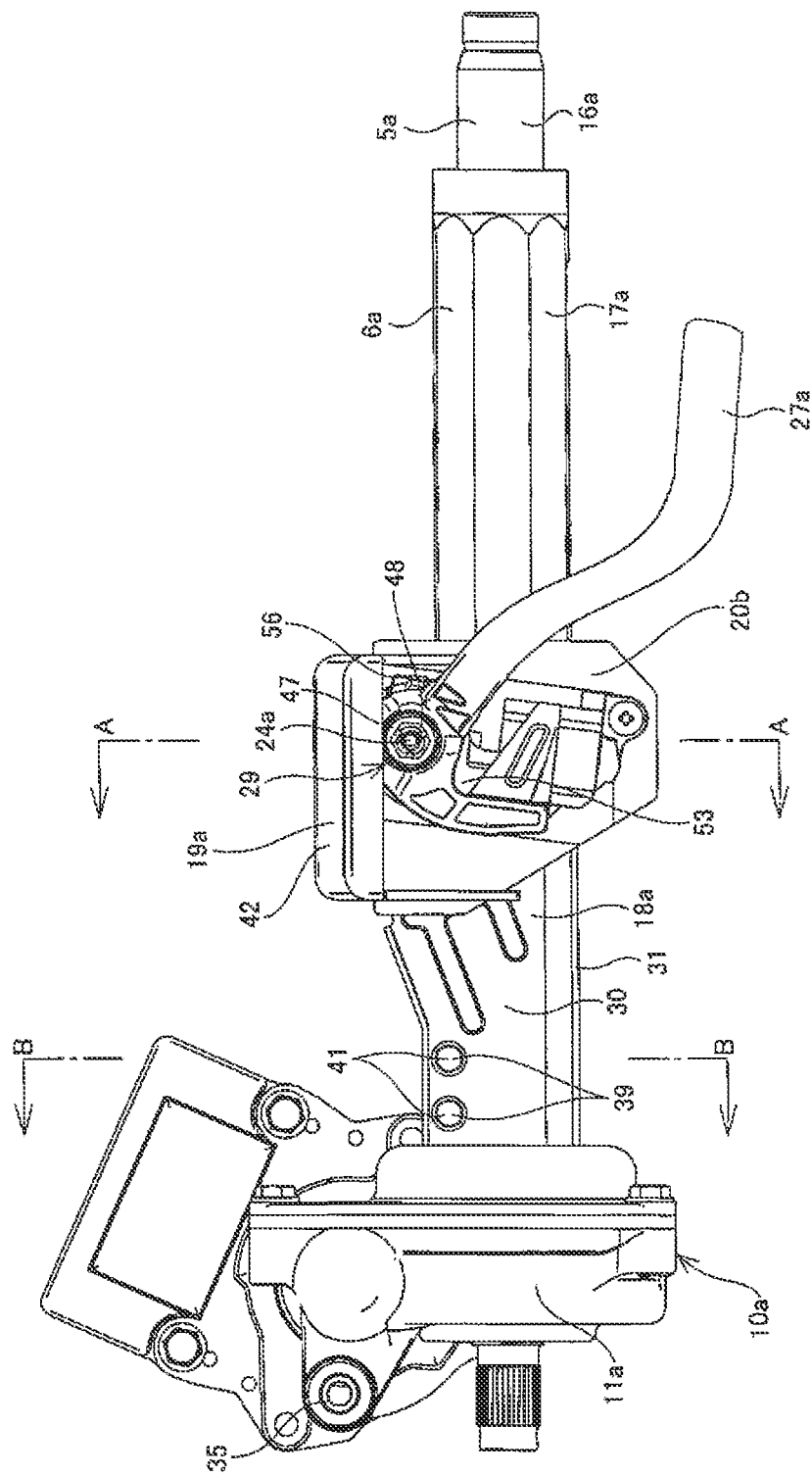
FIG. 3 is a side view of the first example.

A first example of an embodiment of the present invention will be explained using FIG. 1 to FIG. 7. The steering apparatus for an automobile of this example comprises a steering column 6*a*, a steering shaft 5*a*, a housing 11*a* for an electric power steering apparatus 10*a*, a vehicle-side bracket 19*a*, an energy-absorbing member 28 as an attached member and an expansion and contraction mechanism 29.

In this example, in order to achieve the telescopic mechanism, the steering column 6*a* comprises an outer column 18*a* that is front column, and an inner column 17*a* that is a rear column, that are combined so as to be capable of relative displacement in the axial direction. The outer column 18*a* is formed by using a press to perform punching or bending of a metal plate material such as carbon steel plate having sufficient strength and rigidity, and is formed into a U shape that is open at the top comprising a pair of left and right side plate sections 30, the inside surface of which face each other, and a bottom plate section 31 that is connected to the edges on the bottom ends of these side plate sections 30. Moreover, both end sections in the width direction of the bottom plate section 31 are inclined at 45 degrees with respect to both the center section in the width direction of the bottom plate section and the side plate sections 30. The dimension in the up-down direction of the side plate sections 30 (height dimension from the edge sections on both ends of the bottom plate section 31) is comparatively large on the rear-end section and comparatively small on the front-end section, and in the portion between the rear-end section and the front-end section, the dimension changes so as to become smaller going toward the front-end side. The bending rigidity of the side plate sections 30 is maintained by forming a plurality of stiffening beads in both the rear-end section and the middle section of the side plate sections 30, and by forming flange sections by bending the top ends of the middle sections 90 degrees toward the outside in the horizontal direction. Furthermore, restraining blocks 32 are fastened to the portion near the top end of the rear-end section of the inside surfaces of the side plate sections 30 by bolts, welding or the like. The bottom surfaces of these restraining blocks 32 are also inclined 45 degrees with respect to the side plate sections 30 and the center section in the width direction of the bottom plate section 31. The portion that is surrounded by the inside surfaces of the side plate sections 30, the top surface of the bottom plate section 31 and the bottom surface of the restraining blocks 32 is such that the center section in the width direction is open toward the top, and forms nearly an octagonal shaped holding space.

The inner column 17*a* is formed by performing desired plastic working or milling on the end section of an intermediate material that is integrally formed by extrusion or drawing of a metal material containing a light alloy such as an aluminum alloy, magnesium alloy or the like. The outer perimeter surface of the inner column is an octagonal shape. The front section of this inner column 17*a* fits inside the rear section of the outer column 18*a* such that the forward-backward position is adjustable according to displacement in the axial direction. In other words, of the eight flat surfaces of the outer perimeter surface of the inner column 17a, a pair of left and right surfaces that are parallel with each other come in contact with or closely face the inside surfaces of the side plate sections 30, the three flat surfaces in the center and on both the left and right of the bottom side come in contact with or closely face the top surface of the bottom plate section 31, and the two flat surfaces on the left and right of the top side come in contact with or closely face the bottom surfaces of the retaining blocks 32. In construction that does not comprise a telescopic mechanism, the entire steering column can be formed into an arbitrary column shape, and only the front end section is formed into a U shape that is open at the top end by a pair of left and right side plate sections that face each other and a bottom plate section that connects the edges on the bottom ends of the side plate sections.

Moreover, in construction comprising a telescopic mechanism, the steering shaft 5a is such that by combining the rear section of the inner shaft 15a on the front side and the front section of the outer shaft 16 on the rear side by a spline fit, the inner shaft 15a and the outer shaft 16a are capable of transmitting rotation force, and are capable of relative displacement in the axial direction. With this construction, the entire length of the steering shaft 5a is able to expand and contract. The steering shaft 5a passes through the inside of the steering column 6a, and the portion near the rear end of the outer shaft 16a is supported by the rear-end section of the inner column 17a by a bearing such as a single-row deep-groove ball bearing that is capable of supporting both radial loads and thrust loads so that steering shaft 5a can rotate freely.

An electric motor 14a, which is an auxiliary driving source, is supported on one side of the upper portion of the housing 11a for the electric power steering apparatus 10a. Moreover, the housing 11a houses a plurality of component parts including a reduction gear 34 for transmitting the rotation driving force of the electric motor 14a to the steering shaft 5a. Furthermore, a support tube 35 is provided in the left-right direction at the top end section at the front of the housing 11a. The housing 11a is supported by the vehicle body such that it can pivotally displace around a horizontal shaft such as a bolt that is inserted through the support tube 35. With this construction, the steering shaft 5a to which the steering wheel is fastened to the rear-end section, and the steering column 6a that supports the steering shaft 5a are able to displace in the up-down direction. Therefore, in construction that does not comprise a tilting mechanism the housing 11a can be supported by and fastened to the vehicle body by rigid construction.

Figure 5:
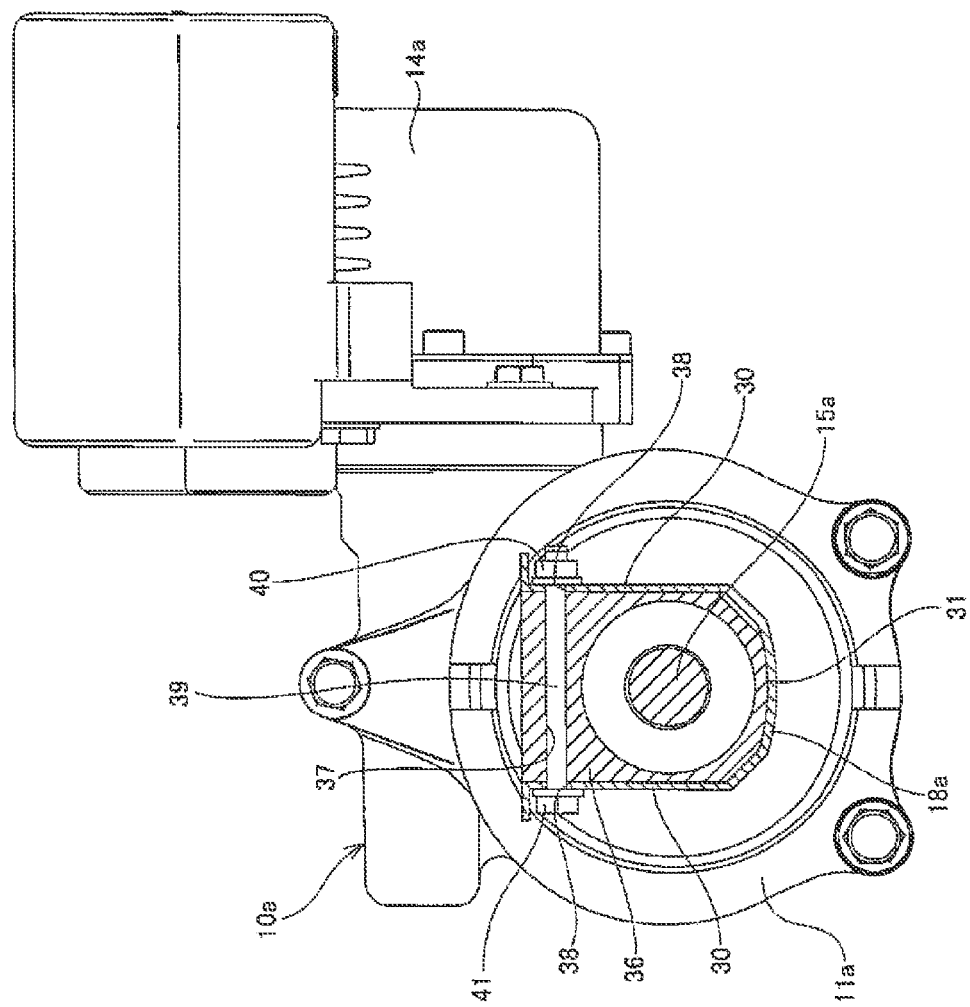
FIG. 5 is a cross-sectional view of section B-B in FIG. 3.

Moreover, the rear-end section of the housing 11a is connected and fastened to the front-end section of the outer column 18a. In this example, a connection and fasting section 36 is provided in the center section of the rear-end surface of the housing 11a, and protrudes toward the outer column 18a side. The outer perimeter surface of this connection and fastening section 36 has a rectangular shaped cross section, and together with being able to be inserted into the front-end section of the outer column 18a through an opening on the top end of the front-end section, as illustrated in FIG. 5, when inserted inside the front-end section, makes a non-circular fit with the front-end section. The shape of the connection and fastening section 36 can be any arbitrary shape other than a rectangular shape as long as it can be inserted into the front-end section of the outer column 18a and can make a non-circular fit with the front-end section.

In this example, the connection and fastening section 36 is such that when inserted inside the front-end section of the outer column 18a, the surfaces on the left and right sides of the connection and fastening section 36 come in contact with the inside surfaces of the pair of side plate sections 30 of the outer column 18a, and the center section in the width direction on the bottom surface of the connection and fastening section 36 comes in contact with the center section in the width direction of the bottom plate section 31 of the outer column 18a. Moreover, through holes 37, 38 in the left-right direction are formed in two locations in the forward-backward direction of portions near the top ends of the connection and fastening section 36 and the side plate sections 30 that are aligned with each other. Fastening bolts 39 are inserted through each of the through holes 37, 38 that are formed at these two locations in the forward-backward direction, and fastening nuts 40 are screwed onto the tip end sections of these fastening bolts 39 and tightened. Then, by firmly holding the connection and fastening section 36 and the side plate sections 30 by the head sections 41 on the base end sections of the fastening bolts 39 and the fastening nuts 40, the connection and fastening section 36 and front-end section of the outer column 18a are connected and fastened together. Furthermore, in this state, the front-end section of the inner shaft 15a is inserted inside the housing 11a through a center hole in the connection and fastening section 36 and connected to component parts of the electric power steering apparatus 10a that are housed inside the housing 11a.

The vehicle-side bracket 19a comprises a top plate section 42 and a pair of holding plate sections 20a, 20b. The top plate section 42 and holding plate sections 20a, 20b are formed by using a press to perform punching and bending of metal plate such as steel plate having sufficient strength and rigidity, and connected and fastened together to form a single piece by welding or the like. Installation holes, through which bolts or studs are passed in order to support the top plate section 42 and fasten the top plate section 42 to the vehicle body, are formed in the top plate section 42. Moreover, holding plate sections 20a, 20b are placed at positions on both sides in the left-right direction of the rear-end section of the outer column 18a. Long holes 22a, 22b that are long in the up-down direction are formed at positions in the top portions of the holding plate sections 20a, 20b that are aligned with each other. The long holes 22a, 22b in the up-down direction are arc shaped around the center axis of the support tube 35.

In this example, an energy-absorbing member 28, which is a component of the inner column 17a, is attached and fastened to the top surface of the front-end section of the inner column 17a. This energy-absorbing member is formed by bending metal plate, such as mild steel plate that is capable of plastic deformation, into a long rectangular frame shape that is long in the forward-backward direction, and an installation plate section 43 protrudes forward from the bottom-end section of the front-end surface thereof. An installation member 44 such as a rivet or screw that is inserted a through hole that is formed in this installation plate section 43 attaches and fastens the energy-absorbing member 28 to the inner column 17a. This energy-absorbing member 28 expands due to plastic deformation that occurs during a secondary collision that accompanies a collision accident, and allows the inner column 17a to displace in the forward direction together with the steering wheel. By this means, it is possible to protect the operator by absorbing energy that is transmitted from the body of the operator to the inner column 17a by way of the steering wheel during a secondary collision.

Moreover, the expansion and contraction mechanism 29 is to expand and contract the distance between the inside surfaces of the holding plate sections 20a, 20b, and comprises an adjustment rod 24a, which is a rod shaped member, an adjustment lever 27a, and a cam device 45. The adjustment rod 24a is inserted in the left-right direction through the long holes 22a, 22b in the up-down direction, through holes 46 that are formed in the side plate sections 30 and restraining blocs 32 of the outer column 18a, and long hole 23a in the forward-backward direction that is long in the axial direction of the inner column 17a and formed in the inside of the energy-absorbing member that is attached to the inner column 17a. Moreover, the adjustment rod 24a is such that a head section 25a is formed on the base end section (right end section in FIG. 4 and FIG. 7), and a convex section that is formed on the inside surface of this head section 25a fits inside one of the long holes 22a in the up-down direction that is formed on one holding plate section 20a of the two holding plate sections 20a, 20b (right holding plate section in FIG. 4 and FIG. 7) so as to be able to displace (move up or down) only along this long hole 22a in the up-down direction. Furthermore, the adjustment lever 27a is such that the base end section is supported by the tip end section (left end section of FIG. 4 and FIG. 7) of the adjustment rod 24a by way of a thrust sliding bearing 47 and nut 48 so that that adjustment lever 27a can rotate with respect to the adjustment rod 24a, and is prevented from displacement in the removal direction from the tip end section of the adjustment rod 24a. The long hole 23a in the forward-backward direction, instead of the energy-absorbing member, can also be formed in the inner column 17a itself, or can be formed in a separate member that is attached to the inner column 17a.

Figure 4:
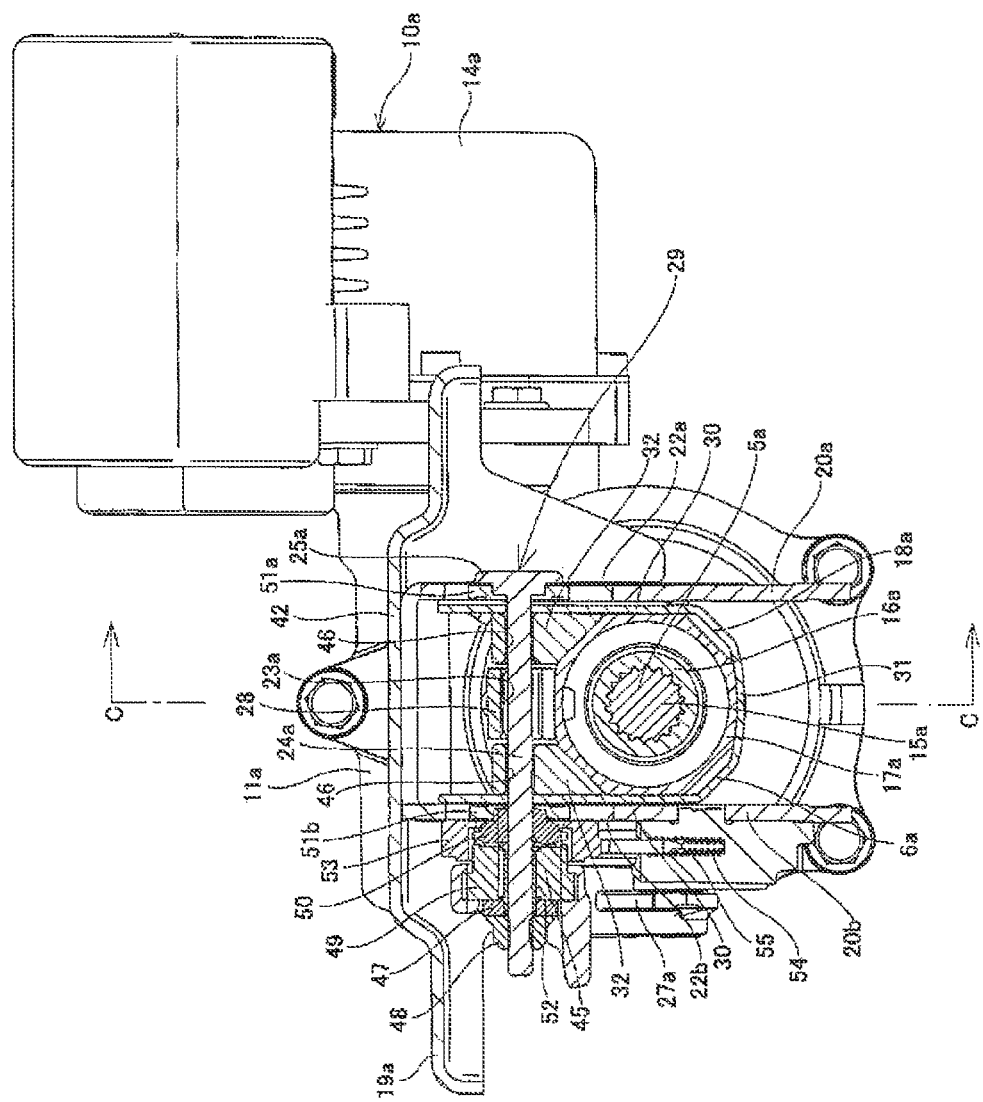
FIG. 4 is a cross-sectional view of section A-A in FIG. 3.
Figure 7:
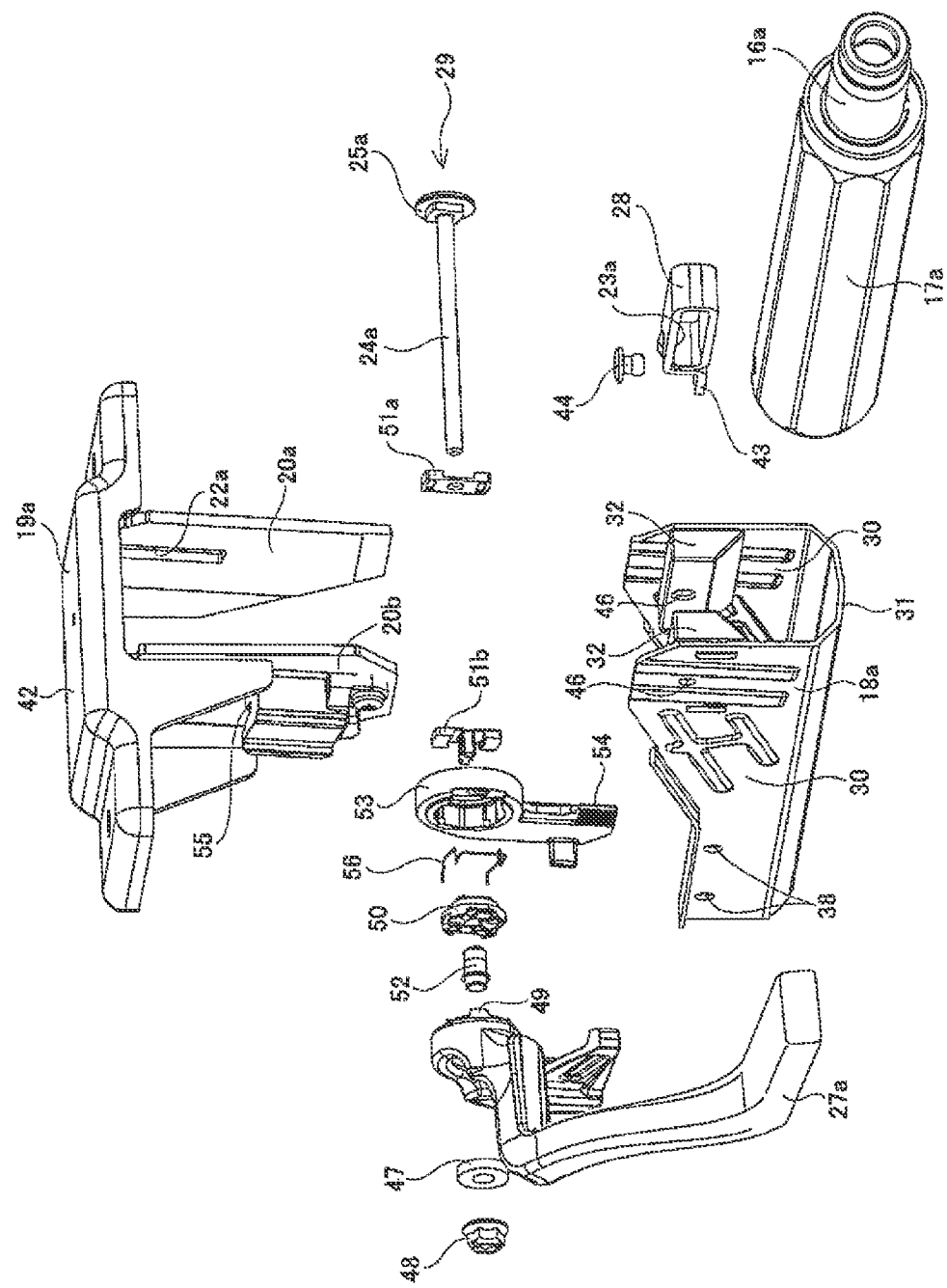
FIG. 7 is an exploded perspective view illustrating the mechanism for adjusting the forward-backward position and the up-down position of the inner column as seen from the upper rear.
Figure 8:
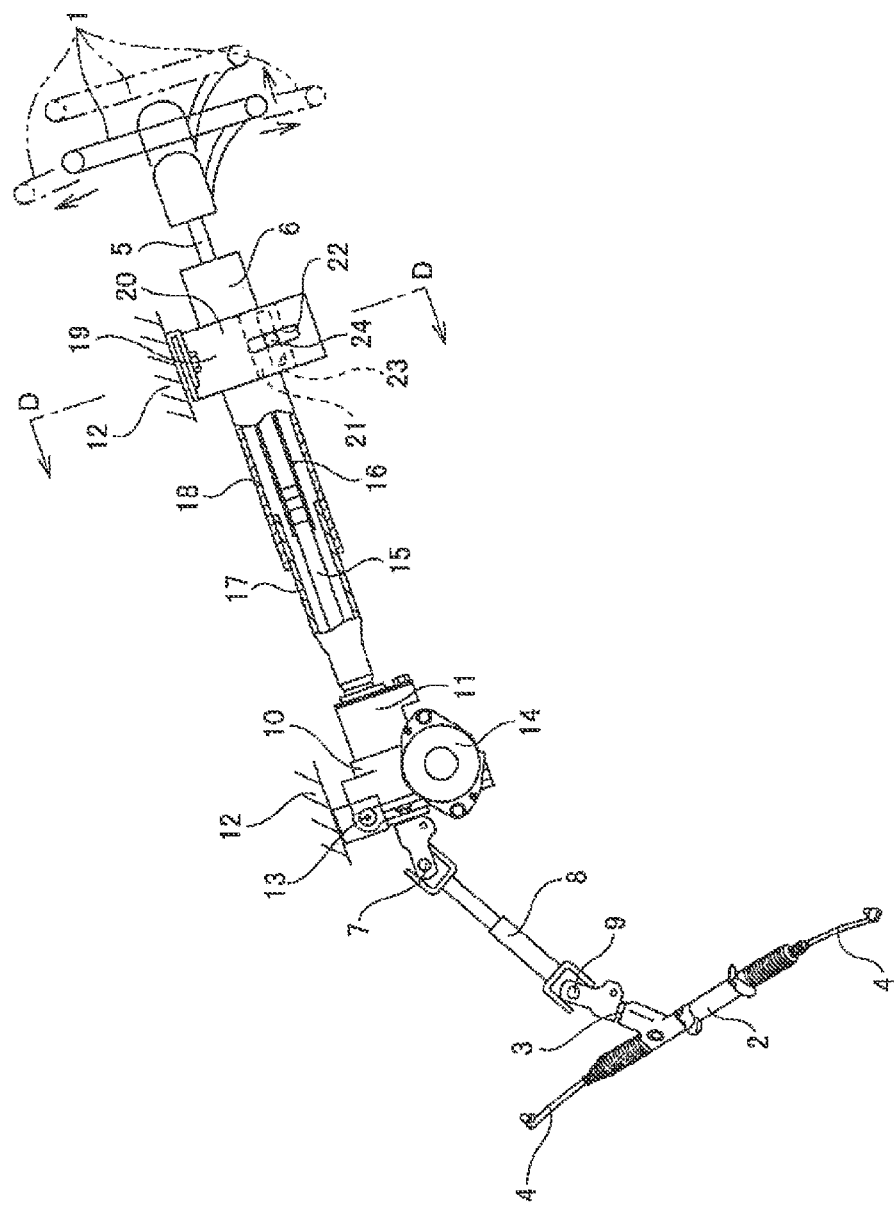
FIG. 8 is a partial cross-sectional view illustrating an example of a conventionally known steering apparatus.
Figure 9:
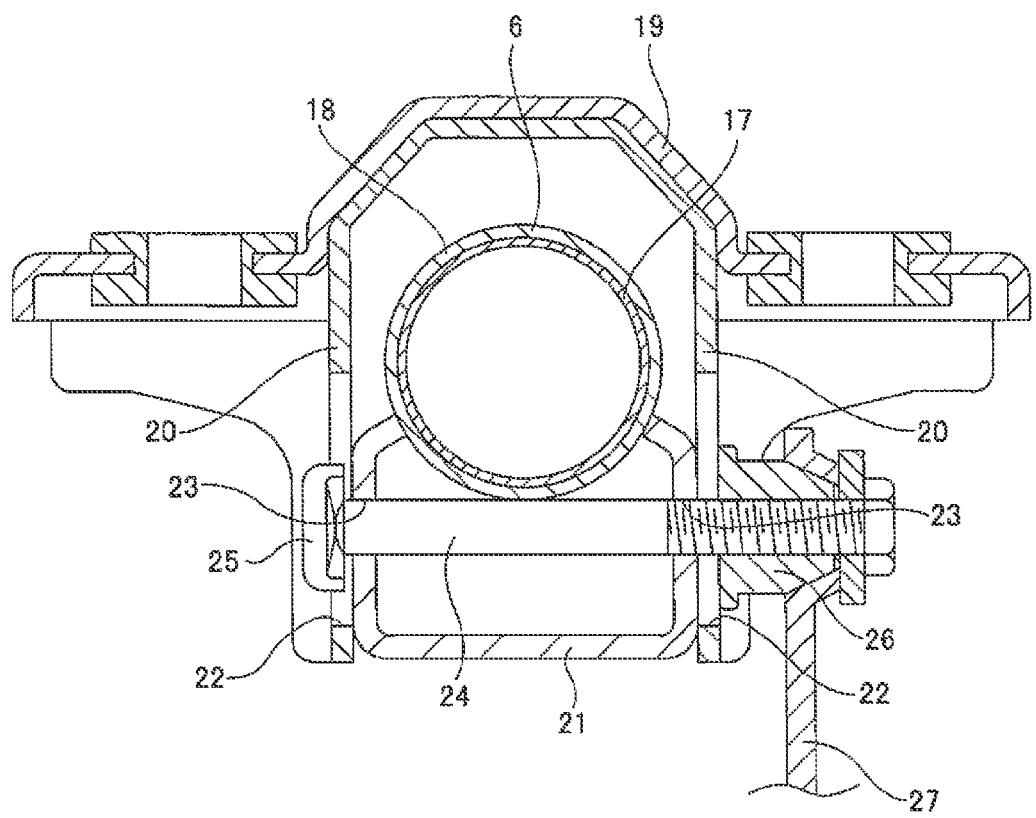
FIG. 9 is a cross-sectional view of section D-D in FIG. 8, with part removed.

The cam device 45 is provided between the inside surface on the base end section of the adjustment lever 27a and the outside surface of the other holding plate section 20b of the two holding plate sections 20a, 20b (left holding plate section in FIG. 4 and FIG. 7). The cam device 45 comprises a driving cam 49 that is supported by the inside surface of the base end section of the adjustment lever 27a and that rotates together with the adjustment lever 27a, and a driven cam 50 that fits in the other long hole 22b in the up-down direction that is formed in the other holding plate section 20b so as to be able to move only up or down. Cam surfaces are formed on the surfaces of the driven cam 50 and the driving cam 49 that face each other, and due to relative rotation between the driven cam 50 and driving cam 49, the dimension in the axial direction of the cam device 45 expands or contracts. In this example, the head section 25a and the driven cam 50 form a pair of pressing sections. Spacers 51a, 51b, which are formed using a material such as synthetic resin that slides easily, are placed over positions in the middle section of the adjustment rod 24a that are located on the inside of the long holes 22a, 22b in the up-down direction, making it possible for the adjustment rod 24a to smoothly displace along the long holes 22a, 22b in the up-down direction. Moreover, the spacer 51b that fits in the other long hole 22b in the up-down direction, by engaging with the driven cam 50, prevents rotation of the driven cam 50. Furthermore, a cylindrical radial sliding bearing 52 that is made using a material that slides easily is located between the inner circumferential surface of the driving cam 49 and the outer circumferential surface of the adjustment rod 24a.

In the case of the steering apparatus of this example, when adjusting the up-down position or the forward-backward position of the steering wheel (not illustrated in the figure) that is fastened to the rear-end section of the steering shaft 5a, the dimension in the axial direction of the cam device 45 is shortened by rotating the adjustment lever 27a in the downward direction. As a result, the distance between the inside surfaces of the holding plate sections 20a, 20b is expanded and the surface pressure at the area of contact between the inside surfaces of these holding plate sections 20a, 20b and the outside surfaces of the side plate sections 30 of the outer column 18a is sufficiently reduced. At the same time, the distance between the side plate sections 30 and the restraining blocks 32 is expanded, and the surface pressure at the area of contact between the outer circumferential surface of the inner column 17 and inner circumferential surface of the outer column 18a is sufficiently reduced. As a result, the state of the outer column 18a and inner column 17a being fastened to the vehicle-side bracket 19a is released. When the up-down position of the steering wheel is adjusted in this state, the steering column 6a and the steering shaft 5a are pivoted around the support tube 35 within the range that the adjustment rod 24a can displace inside the long holes 22a, 22b in the up-down direction. On the other hand, when adjusting the forward-backward direction of the steering wheel, the entire length of the steering column 6a and the steering shaft 5a is extended or contracted within the range that the adjustment rod 24a can displace in the long hole 23a in the forward-backward direction. After adjustment, by rotating the adjustment lever 27a in the upward direction, the dimension in the axial direction of the cam device 45 is expanded. As a result, due to an operation that is opposite that when releasing the fastened state above, the surface pressure at the areas of contact is sufficiently increased. Consequently, the steering wheel is maintained at the adjusted position.

Moreover, in this example, construction is provided for increasing the support strength for supporting the steering wheel in the adjusted up-down position. In other words, the base section of a pivot arm 53 is fitted over the portion of the adjustment rod 24a near the tip end of the middle section so as to be able to pivot and displace. Moreover, a male gear 54 is provided on the tip end section of the pivot arm 53 and a female gear 55 is provided on part of the outside surface of the holding plate section 20b, and as the pivot arm 53 pivots, the male gear 54 and female gear 55 can be placed in either the engaged state or released state. As the adjustment lever 27a is rotated in a direction for adjusting the position of the steering wheel, the pivot arm 53 is pivoted in a direction that releases the engagement between the male gear 54 and the female gear 55. When the male gear 54 and the female gear 55 are in the engaged state, the adjustment rod 24a is connected with the holding plate section 20b by way of the pivot arm 53, so regardless of whether there is a large impact load during a secondary collision, the up-down position of the steering wheel does not move a large amount.

The driven cam 50 is assembled to the base section of the pivot arm 53 so as to be able to rotate relative to the pivot arm 53 as well as to be able to displace a little in the up-down direction with respect to the pivot arm 53. The driven cam 50, as described above, is such that relative rotation with respect to the holding plate section 20b is prevented. Moreover, a restoring spring 56 is provided between the driven cam 50 and the pivot arm 53 such that the driven cam 50 is supported on the pivot arm 53 so as to be able move up or down a little about a neutral position. The reason for allowing this small amount of up or down movement is that, even though the up-down position of the steering wheel can be adjusted in a smooth non-step manner, the engagement position between the male gear 54 and female gear 55 is in steps, so this small amount of up or down movement absorbs that difference.

With the steering apparatus of this example, it is possible to make the assembly direction of the steering column 6a in the vehicle-side bracket 19a coincide with the assembly direction of the steering column 6a in the housing 11a. In other words, when assembling the steering column 6a into the vehicle-side bracket 19a, the middle portion of the steering column 6a (rear-end section of the outer column 18a) is inserted between the pair of holding plate sections 20a, 20b of the vehicle-side bracket 19a from the bottom end edge side of these holding plate sections 20a, 20b. That is, the assembly direction of the steering column 6a with respect to the vehicle-side bracket 19a is in the radial direction of the steering column 6a (direction from the bottom surface toward the top surface). On the other hand, when assembling the steering column 6a in the housing 11a, the connection and fastening section 36 that is provided on the rear-end section of the housing 11a is inserted into the front-end section of the steering column 6a (front-end section of the outer column 18a) from an opening on the top end of this front-end section. That is, the assembly direction of the steering column 6a with respect to the housing 11a can also be in the radial direction of the steering column 6a (direction from the bottom surface toward the top surface).

Figure 6:
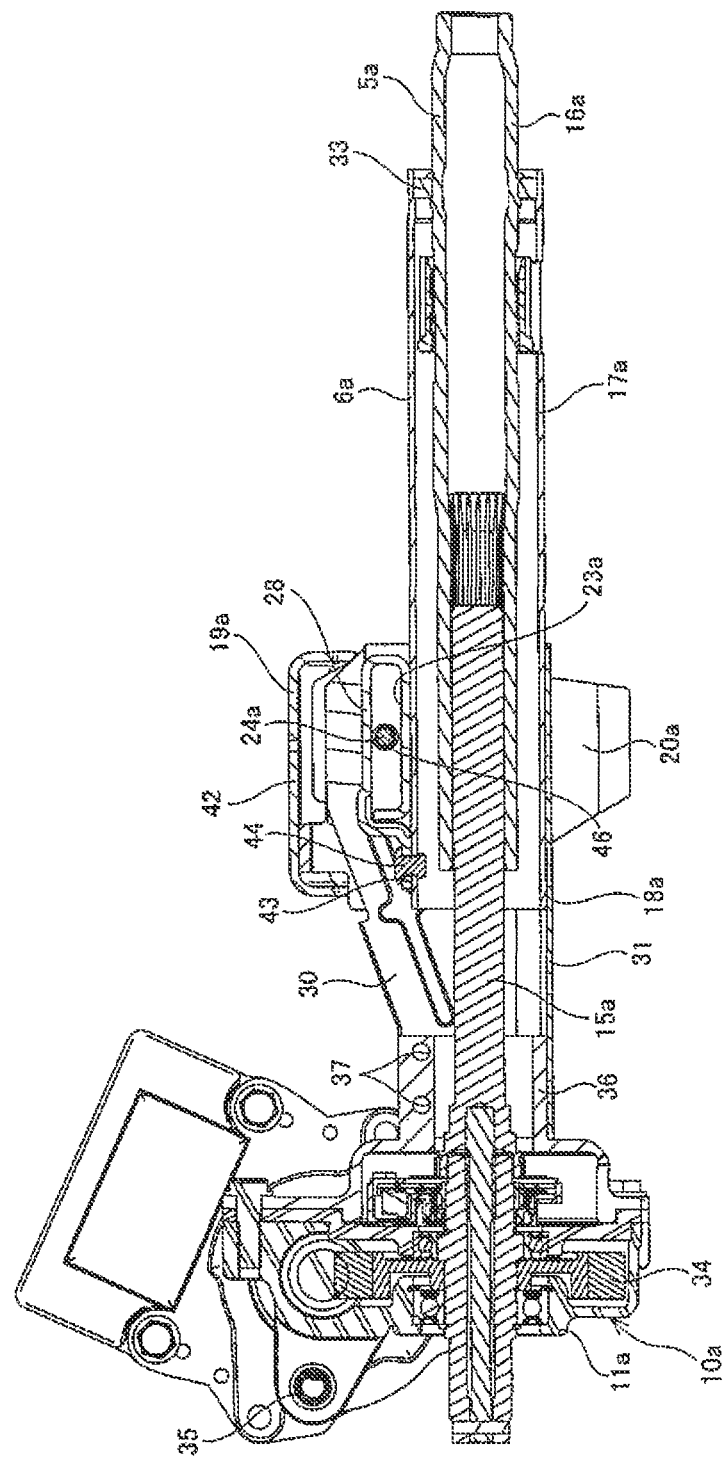
FIG. 6 is a cross-sectional view of section C-C in FIG. 4.

Therefore, when assembling the steering apparatus of this example, the housing 11a and the vehicle-side bracket 19a are set in a holding tool with the positional relationship illustrated in FIG. 6, and in this state, the front-end section and the middle section of the steering column 6a can be assembled into the connection and fastening section 36 of the housing 11a and the pair of holding plate sections 20a, 20b of the vehicle-side bracket 19a in the radial direction of the steering column 6a from the bottom in FIG. 6. Therefore, assembling the steering column 6a in the vehicle-side support bracket 19a and assembling the steering column 6a in the housing 11a can be performed in one process, and thus it is possible to improve the ease of assembly of the steering apparatus by that amount. The actual work is performed in the positional relationship of up-and-down is opposite from the positional relationship illustrated in FIG. 6.

The work of inserting the connection and fastening section 36 inside the front-end section of the steering column 6a, and the work of inserting the middle section of the steering column 6a into the portion between the holding plate sections 20a, 20b can be performed in order as described below. First, the housing 11a and the vehicle-side support bracket 19a are set in a holding tool with the positional relationship illustrated in FIG. 6, and then only the housing 11a is pivoted and displaced around the support tube 35 toward the bottom in FIG. 6. Then, in this state, the connection and fastening section 36 is inserted inside the front-end section of the steering column 6a through opening in the top ends of the front-end section. After that, the housing 11a and the steering column 6a are pivoted and displaced around the support tube 35 toward the top in FIG. 6, and the middle section of the steering column 6a is inserted into the portion between the holding plate sections 20a, 20b. When insertion work is performed in this kind of order, with the insertion work of one completed, the phase in the rotational direction of the steering column 6a is in the proper phase, and this proper phase is maintained, so it becomes easy to perform the following insertion work. In this case as well, the two insertions described above can be performed in one process on an assembly line for the steering apparatus.

In either case, in this example, the work of inserting the connection and fastening section 36 inside the front-end section of the steering column 6a through an opening on the top ends of the front-end section is performed in a state wherein the steering shaft 5a is not placed inside the steering column 6a, or is performed in a state wherein the front-end section of the steering shaft that has been placed inside the steering column 6a is moved sufficiently out of the way toward the rear. In this way, the front-end section of the steering shaft 5a is prevented from hindering the insertion work.

In the case of the steering apparatus of this example, the connection and fastening section 36 and the side plate sections 30 are fastened together at the portion near an opening on the top end of the side plate sections 30 (opposite side from the bottom plate section 31) by fastening bolts 39, so the side plate sections 30 bend or bow and are firmly tightened to the connection and fastening section 36. Similarly, the expansion and contraction mechanism 29 is also constructed so as to be inserted into through holes 46 that are formed in portions near the top end of the side plate sections 30, so in the fastened state, the side plate sections 30 bend or bow, so the tightening force by this expansion and contraction mechanism 29 is tight with respect to the steering column 6a. Furthermore, the insertion direction of the adjustment rod 24a through the through holes 46, and the insertion direction of the fastening bolts 39 through the through holes 37, 38 are in the left-right direction, and coincide with each other, so it is possible to further improve the ease of assembly of the steering apparatus. In addition, in this example, a combination of through holes 37, 38, fastening bolts 39 and fastening nuts 40 that is used for connecting and fastening the connection and fastening section 36 and the front-end section of the steering column 6a is provided at two locations that are separated in the forward-backward direction. Therefore, it is possible to sufficiently maintain the bending rigidity of the connecting section between the connection and fastening section 36 and the front-end section of the steering column 6a.

INDUSTRIAL APPLICABILITY

In the embodiment of the present invention described above, the present invention is applied to construction that comprises both a tilt mechanism for making it possible to adjust the up-down position of the steering wheel, and a telescopic mechanism for making it possible to adjust the forward-backward position of the steering wheel. However, the present invention can also be applied to construction that comprises only one of these mechanisms.

EXPLANATION OF REFERENCE NUMBERS

1 Steering wheel
2 Steering gear unit
3 Input shaft
4 Tie rod
5, 5a Steering shaft
6, 6a Steering column
7 Universal joint
8 Intermediate shaft
9 Universal joint
10, 10a Electric power steering apparatus
11, 11a Housing
12 Vehicle body
13 Horizontal shaft
14, 14a Electric motor
15, 15a Inner shaft
16, 16a Outer shaft
17, 17a Inner column
18, 18a Outer column
19, 19a Vehicle-side bracket
20, 20a, 20b Holding plate section
21, 21a Column-side bracket
22, 22a, 22b Long hole in the up-down direction
23, 23a Long hole in the forward-backward direction
24, 24a Adjustment rod
25, 25a Head section
26 Adjustment nut 27, 27a Adjustment lever
28 Energy absorbing member
29 Expansion and contraction mechanism
30 Side plate section
31 Bottom plate section
32 Retaining block
33 Bearing
34 Reduction gear
35 Support tube
36 Connection and fastening section
37 Through hole
38 Through hole
39 Fastening bolt
40 Fastening nut
41 Head section
42 Top plate section
43 Installation plate section
44 Installation member
45 Cam device
46 Through hole
47 Thrust sliding bearing
48 Nut
49 Driving cam
50 Driven cam
51a, 51b Spacer
52 Radial sliding bearing
53 Pivot arm
54 Male gear
55 Female gear
56 Restoring spring

What is claimed is:

1. A steering apparatus configured for installation in a vehicle body of an automobile defining forward, rearward, right, left, upward, and downward directions, the steering apparatus comprising:
    a steering column having a front-end section disposed in the forward direction, a rear-end section disposed in the rearward direction, and a middle section therebetween, the front-end section is formed in a U shape and comprises a pair of left and right side plate sections that face each other, a bottom plate section disposed in the downward direction that connects to edges on bottom ends of these side plate sections, and an opening disposed in the upward direction on a top end of the front-end section, the side plate sections and bottom plate section defining a cavity therebetween;
    a housing for an electric power steering apparatus that is supported by the vehicle body and that has a connection and fastening section on a rear of the housing disposed in the rearward direction that is capable of being inserted inside the cavity of the front-end section of the steering column through the opening in the top end of the front-end section, and when inserted inside the cavity of the front-end section is capable of a non-circular fit in the front-end section;
    a vehicle-side bracket that is supported by the vehicle body and that has a pair of holding plate sections that are located at positions on both left and right sides of the middle section of the steering column, with a portion between edges on bottom edges of the holding plate sections being open, the pair of holding plate sections have through holes that are formed in positions of the holding plate sections that are aligned with each other; and
    an expansion and contraction mechanism that comprises a rod shaped member that is inserted in the left-right direction through the through holes of the holding plate sections and a pair of pressing sections that are provided on both end sections of the rod shaped member, and by moving these pressing sections away from each other or close to each other in the axial direction of the rod shape member, the distance between the holding plate sections is changed, and when this distance is contracted, the expansion and contraction mechanism fastens the steering column to these holding plate sections, and
    the steering column configured to be assembled to the vehicle-side bracket and the housing in a direction from a bottom surface of the steering column disposed in the downward direction toward a top surface of the steering column disposed in the upward direction, with the middle section of the steering column being inserted between the pair of holding plate sections and the connection and fastening section being inserted into the front-end section from the opening on the top end and fitted with a non-circular fit inside the front-end section, the connection and fastening section and the front-end section of the steering column being connected and fastened together by a bolt.

2. The steering apparatus according to claim 1, wherein through holes in the left-right direction are formed at positions in the side plate sections of the front-end section of the steering column and in the connection and fastening section of the housing that are aligned with each other; and together with inserting a bolt through these through holes that are formed in the side plate sections and the connection and fastening section, a nut is screwed on the tip end section of the bolt.

3. The steering apparatus according to claim 2, wherein more than one set of the through holes is formed in the side plate sections and the connection and fastening section, and together with inserting a bolt through each of the through holes, a nut is screwed on the tip end section of the bolt.

4. The steering apparatus for an automobile according to claim 1, wherein
    the housing is supported by the vehicle body so as to be able to pivotally displace around a horizontal shaft that is arranged in the left-right direction;
    the through holes in the holding plate sections are long holes in the upward-downward direction that are arc shaped around the center of the horizontal shaft;
    a through hole is formed in the middle section of the steering column at a position that is aligned with the long holes in the upward-downward direction;
    the rod member is inserted through the long holes in the upward-downward direction of the housing and the through hole of the steering column; and
    when the fastened state of the steering column being fastened to the holding plate sections is released by enlarging the distance between the holding plate sections by the expansion and contraction mechanism, the up-down position of the steering column can be adjusted within the range that the rod shaped member can displace in the long holes in the upward-downward direction.

5. The steering apparatus for an automobile according to claim 1 wherein
    the steering column comprises a front column that is disposed in the forward direction, and a rear column that is disposed in the rearward direction and assembled so as to be able to displace relative to the front column;
    the front-end section is formed on the front column;
    a through hole is formed in the rear section of the front column at a position that is aligned with the through holes in the holding plate sections;

a long hole in the forward-backward direction that is long in the axial direction of the rear column is formed in the rear column at a position that is aligned with the through holes in the holding plate sections and the through hole in the front column;

the rod shaped member is inserted through the through holes in the holding plate sections, the through hole in the front column and the long hole in the forward-backward direction of the rear column; and when the fastened state of the rear column being fastened to the holding plate sections and the front column is released by enlarging the distance between the holding plate sections by the expansion and contraction mechanism, it is possible to adjust the forward-backward position of the rear column within a range that the rod shaped member can displace inside the long hole in the forward-backward direction.

6. The steering apparatus for an automobile according to claim 5, wherein the front column is an outer column, and the entire outer column has side plate sections and a bottom plate section, forming a U shape that is open at the top;

the rear column is an inner column and is such that the front section of the inner column fits inside the rear section of the outer column;

the expansion and contraction mechanism expands or contracts the inner dimension of the rear section of the outer column by changing the distance between the holding plate sections, such that when the inner dimension is contracted, displacement in the axial direction of the inner column with respect to the outer column is suppressed, and when the inner dimension is expanded, displacement in the axial direction of the inner column with respect to the outer column is possible.

7. The steering apparatus for an automobile according to claim 6, wherein through holes in the left-right direction are formed at positions in the side plate sections of the outer column and in the connection and fastening section of the housing that are aligned with each other; and together with inserting a bolt through these through holes that are formed in the side plate sections and the connection and fastening section, a nut is screwed on the tip end section of the bolt, and the through holes that are formed in the side plate section through which the bolt is inserted, and the through holes that are formed in the rear section of the side plate sections through which the rod shaped member is inserted are formed in portions near the openings on the top end of the side plate sections.

\* \* \* \* \*